(12) United States Patent
Scofet et al.

(10) Patent No.: US 7,093,986 B2
(45) Date of Patent: Aug. 22, 2006

(54) LOW COST OPTICAL MODULE

(76) Inventors: Marco Scofet, Agilent Technologies Italia, Via G. Reiss Romoli, 274, 10448 Torino (IT); Cristiana Contardi, Agilent Technologies Italia, Via G. Reiss Romoli, 274, 10148 Torino (IT); Salvatore Sabbatino, Agilent Technologies Italia, Via G. Reiss Romoli, 274, 10148 Torino (IT); Stefano Genisio, Agilent Technologies Italia, Via G. Reiss Romoli, 274, 10148 Torino (IT)

(*) Notice: Subject to any disclaimer, the term of this patent is extended or adjusted under 35 U.S.C. 154(b) by 27 days.

(21) Appl. No.: 10/772,949

(22) Filed: Feb. 5, 2004

(65) Prior Publication Data
US 2004/0161208 A1    Aug. 19, 2004

(30) Foreign Application Priority Data
Feb. 15, 2003   (GB) ................................. 0303526.8

(51) Int. Cl.
*G02B 6/42*   (2006.01)
(52) U.S. Cl. .......................................... 385/92; 385/94
(58) Field of Classification Search ............ 385/88–92, 385/94, 63; 257/98, 432
See application file for complete search history.

(56) References Cited

U.S. PATENT DOCUMENTS

| | | | |
|---|---|---|---|
| 4,548,466 A | 10/1985 | Evans | 350/96.2 |
| 4,741,589 A | 5/1988 | Halder | 350/96.2 |
| 5,065,011 A | 11/1991 | Fujihara et al. | 250/227.24 |
| 6,310,707 B1* | 10/2001 | Kawase et al. | 398/119 |
| 6,364,541 B1* | 4/2002 | Nesnidal et al. | 385/92 |
| 6,659,659 B1* | 12/2003 | Malone | 385/94 |
| 6,786,652 B1* | 9/2004 | Marquez et al. | 385/92 |
| 2003/0077050 A1* | 4/2003 | Marion et al. | 385/90 |

FOREIGN PATENT DOCUMENTS

| | | |
|---|---|---|
| FR | 2815139 | 10/2000 |
| JP | 56001577 | 6/1979 |
| JP | 57027064 | 2/1982 |
| JP | 60107859 | 6/1985 |
| JP | 2162305 | 6/1990 |

* cited by examiner

*Primary Examiner*—Rodney Bovernick
*Assistant Examiner*—Mike Stahl

(57) ABSTRACT

The present invention comprises an optical module, passively aligned and used in high-speed optical communication systems, having a ferrule disposed in an aperture in an upper plate of the module. The ferrule protrudes a predetermined distance through the aperture in order to guarantee butt coupling of an optical fibre to an active optical component disposed at a predetermined height on a lower plate of the module.

15 Claims, 6 Drawing Sheets

LOW COST OPTICAL MODULE

This application claims benefit of the earlier filed British Application No. GB 0303526.8, Filed Feb. 15, 2003.

FIELD OF THE INVENTION

The present invention relates to a low cost package for optical modules. More specifically, the present invention relates to a ceramic passively aligned co-axial package for an optical module used in high-speed optical communication systems.

BACKGROUND OF THE INVENTION

As seen in FIG. 1, currently optical modules 1, including transmitters, receivers and transceivers, are packaged in metal or ceramic boxes 5. Alignment between the optical fibre 16 disposed in V groove of a silicon optical bench 18 and an active optical element 14 is achieved using an active optical alignment process implemented during the assembly of the receiver module. The V groove fibre 16 is then coupled to a further fibre 10 located in a ferrule 12 attached to an aperture 7 at one end on the module.

As use of the Internet and optical fibre based communication increases, there is a growing need for faster transmission rate. Transmission rates of 10 Gb/s are becoming common and this is set to increase in the near future to 40 Gb/s and beyond.

In addition, there is a constant effort among network and communication system providers to drive down the cost of the systems, which means both component and transceiver module manufacturers must reduce the cost of their product in order to remain competitive.

An active alignment process in which the fibre is moved into position with respect to the active optical element while the element is powered is both labour intensive and time consuming, and thus expensive and not in-line with current industry efforts to reduce the cost of optical module packages.

Furthermore, due to the small size of the active area of high-speed components, such as a 10 Gb/s photodiode, very precise alignment must to be achieved between the fibre and the photodiode in order to maximize coupling efficiency. For example, a fibre placed 50 um from a photodiode will need to be placed with a 5 um tolerance in the transversal plane and a 10 um tolerance on longitudinal axis.

SUMMARY OF THE INVENTION

The present invention aims to provide a low cost, passively aligned optical module package suitable for very high bit rates (10–40 Gb/s), with the micrometer accuracy required for positioning of high-speed optical components.

According to the present invention there is provided an optical module comprising an upper plate having an aperture, and a lower plate, said lower plate having at least one active optical component disposed thereon at a predetermined height above an upper surface of said lower plate, said module further comprising a ferrule disposed within said aperture, said ferrule extending through said aperture a predetermined distance, so as to facilitate passive alignment of a fibre disposed in said ferule and said at least one active optical component.

According to a further aspect of the present invention there is provided a method of passively aligning a high-speed optical module, said method comprising the steps of disposing a ferrule within an aperture of an upper plate at a predetermined distance from said upper plate, disposing at least one active optical component on a lower plate at a predetermined height above an upper surface of said lower plate, wherein said predetermined distance and said predetermined height are such that efficient optical coupling is achieved between a fibre disposed within said ferrule and said at least one active optical component.

Advantageously, the optical module does not require the use of a lens, as the fibre is directly butt coupled to the photodiode, thus reducing the cost of the module, while achieving the alignment accuracy needed for high speed components.

BRIEF DESCRIPTION OF THE DRAWINGS

While the principle advantage and features of the present invention have been described above, a greater understanding and appreciation of the invention may be obtained by referring to the drawings and detailed description of the preferred embodiment, presented by way of example only, in which.

DESCRIPTION OF THE PREFFERED EMBODIMENTS

Figure 1:
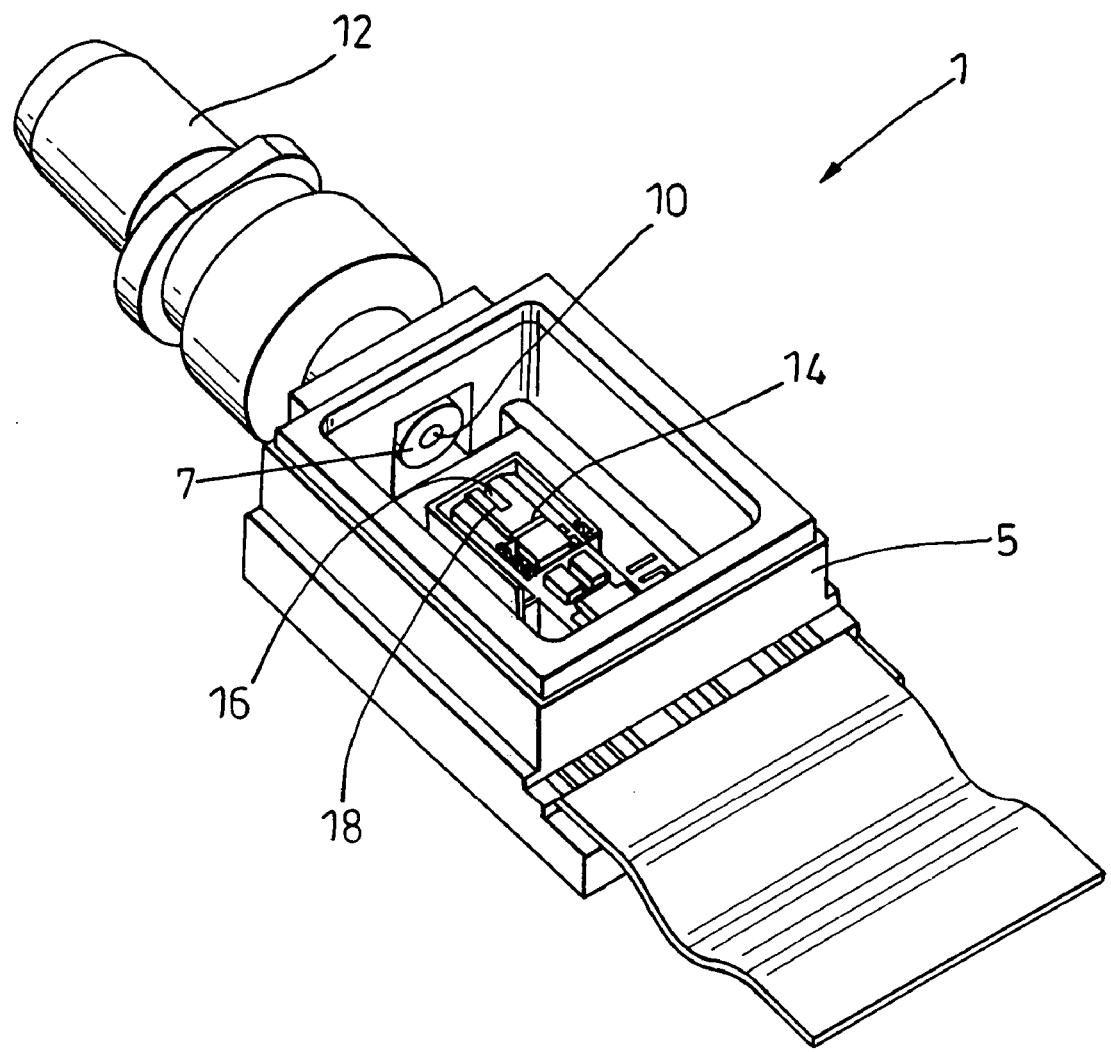
FIG. 1 shows optical modules packaged in a metal or ceramic box.
Figure 2:
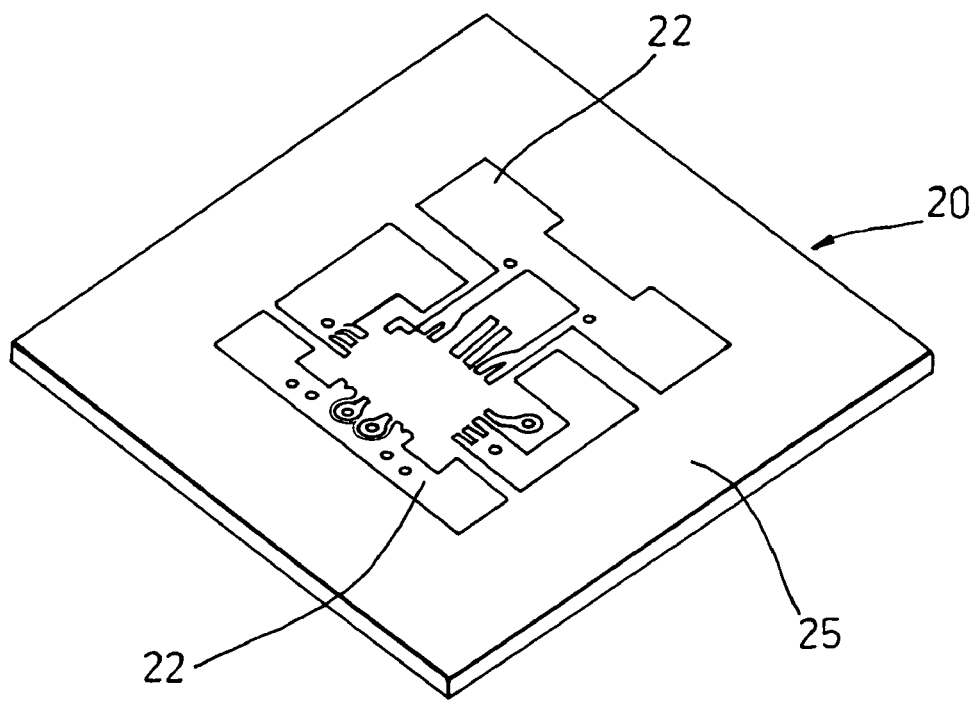
FIG. 2 shows the base plate with electrical tracks.
Figure 3:
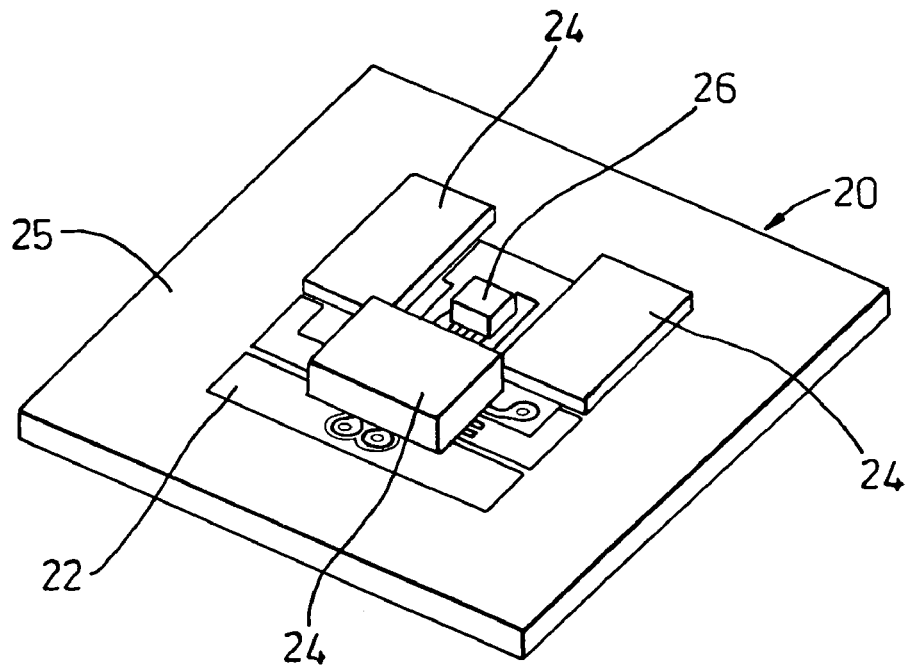
FIG. 3 shows the base plate of FIG. 2 populated with components.

In FIG. 2 the base plate 20 is a substantially flat tile approximately a few square mm in size and is typically made of a ceramic material with a planarity controlled to within +/−5 um. The use of a ceramic material aids in the distribution of heat generated by any active components placed on the tile. Electrical tracks 22 are disposed on the surface 25 of the tile according to the specific needs of the module. As seen in FIG. 3, various components 24 are attached to the tile at predetermined locations. An active optical component 26 is also disposed on surface 25 of the tile at a predetermined location.

As will be appreciated, materials other than ceramic can be used, such as plastics or dielectric material, provided sufficient planarity is maintained.

The components 24 and 26 can be mounted using epoxy or alternatively, ultrasonic bonding. Components 24 and 26 can be than be electrically connected to tracks 22 using wire-bonding methods.

Alternatively, "flip chip" bonding methods can be employed in which ultrasonic power is used to attach the component or chip to the tile, thus reducing the possibility of contamination to the internal components that often occurs when epoxy or soldering methods are used. With this method it is possible to mechanically attach the components and at the same time create the electrical connections without the use adhesives or solder and thus simplify the process.

In the embodiment shown here the optical module is a receiver module and the active optical component 26 is a detector having an active area of 35 um for 10 Gb/s or less for higher bit rate. The detector may be a PIN type detector or avalanche photodiode (APD). The detector can be mounted using the "flip chip" method.

In a further embodiment, the optical module is a transmitter module and the active optical component 26 is a light source. The light source may be a laser. The laser may be a vertical cavity surface emitting (VCSEL) type laser. The laser can be mounted using the "flip chip" method.

Figure 4:
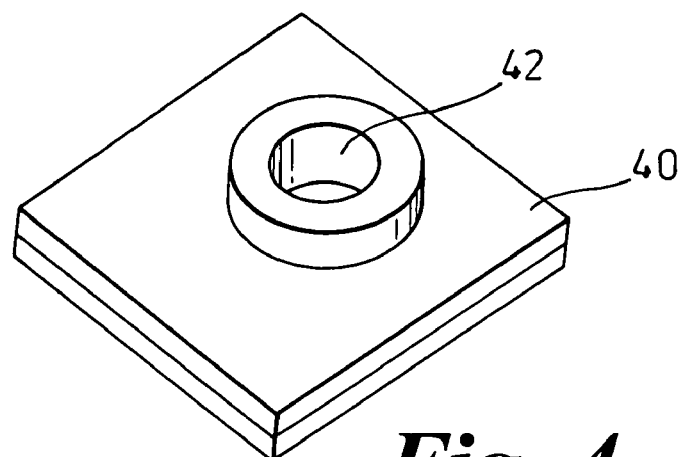
FIG. 4 shows the cover plate with an aperture.
Figure 5:
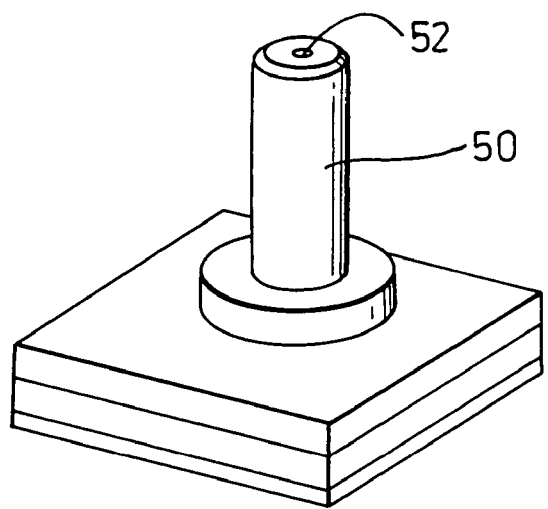
FIG. 5 shows the cover plate of FIG. 4 with a ferrule attached.
Figure 6:
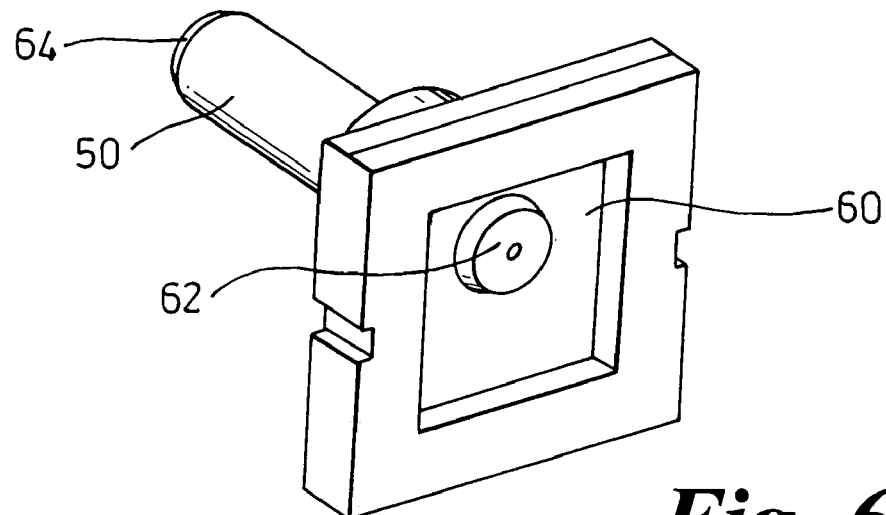
FIG. 6 shows the underside of the ferrule/cover plate assembly of FIG. 5.

In FIG. 4 the top plate 40 is shown having a centrally located aperture 42. The top plate can also be made from ceramic material or metal. As seen in FIGS. 5 and 6, a ferrule 50 is disposed in the aperture 42. Ferrules are well known in the art as a means of holding optical fibres, which are typically disposed along a centrally located axis 52 of the ferrule. As will be appreciated, an antireflection coated flat ferrule or an angled ferrule can be used.

The ferrule 50 is positioned within the aperture 42 so that it extends through the bottom surface 60 of the top plate 40 by a pre-determined distance. The accuracy of the axial alignment (Z direction) of the ferrule is within 5 microns. This is partly due to being able to position the ferrule without stress and at room temperature. The ferrule is inserted into the hole without any friction and positioned at the desired height thanks to a mechanical stop on a separate jig assembly. The correct Z alignment relies on the accurate positioning of the mechanical stop with respect to the bottom surface of the top plate. An adhesive is then dispensed at the interface of the cover-ferrule and cured to fix the ferrule position in the Z direction. The room temperature process is able to guarantee a target alignment +/−5 um. A fibre (not shown) is located along the central axis 52 of the ferrule. The end of the fibre is polished so that it is substantially parallel with the end face 62 of the ferrule. At the opposite end of the ferrule the end of the optical fibre may also be polished so that it is substantially parallel to end face 64 of the ferrule or, alternatively, an angled ferrule can be used.

Figure 7:
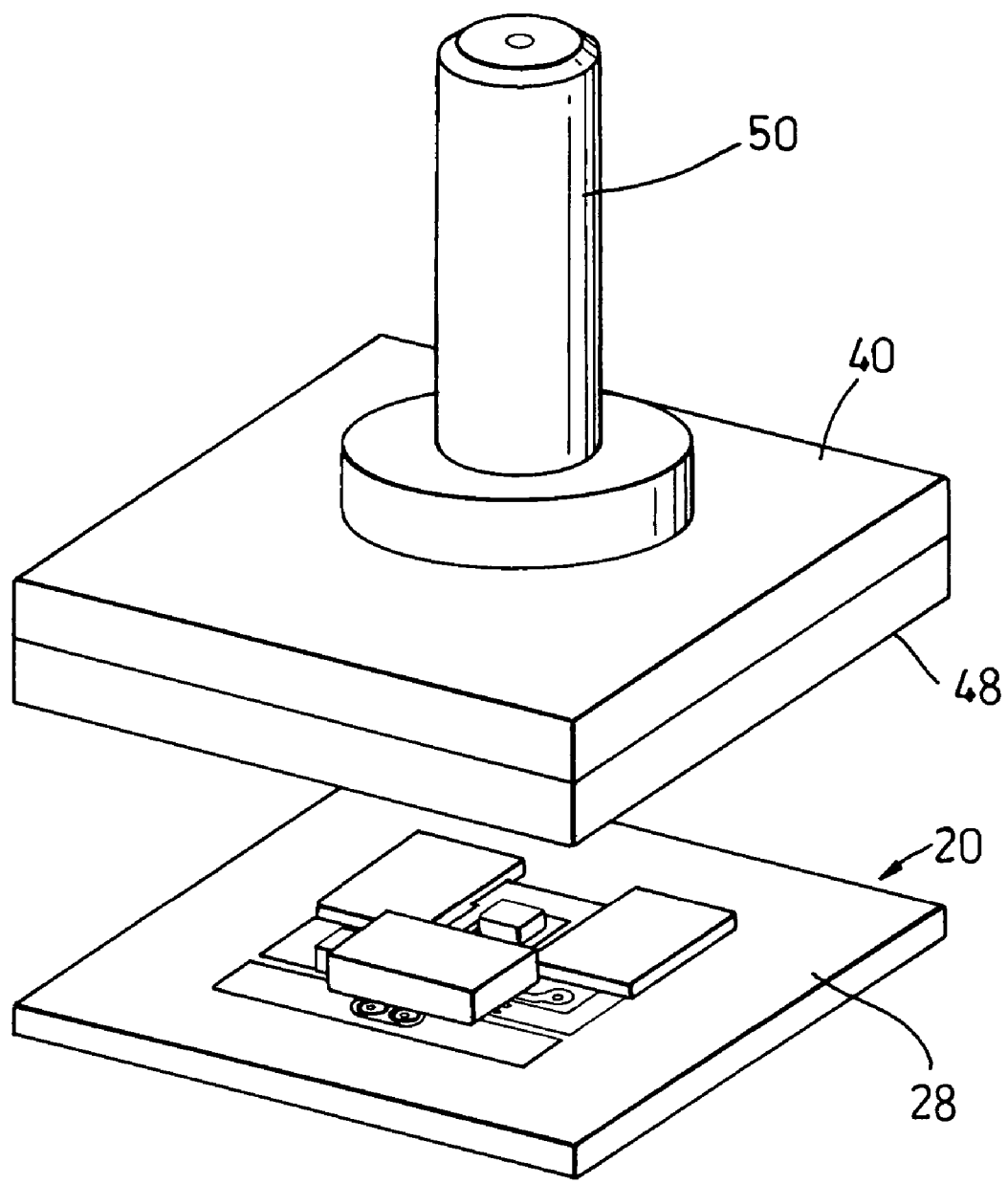
FIG. 7 shows the cover plate and base plate prior to assembly.

As seen in FIG. 7, the top plate 40 is positioned over bottom plate 20 and aligned along the transversal plane (X and Y direction). A visual system, which allows images of the fibre cladding and the photodiode active area to overlap, is used to relatively align the two components with a precision of few microns (2–3 um). The top and bottom plates are than sealed together along the outer edges 48 and 28 of the plates. The precise alignment tolerances in X-Y direction is ensured by the planarity of the tile and cover base flat surfaces, thus ensuring intimate contact between the two parts without any drift, tilt or shift. The Z alignment was previously fixed. The seal is such that components 24 and detector 26 are protected from possible contamination by external sources. This typically means the package is hermetically sealed. The seal can be achieved using epoxy or soldering techniques.

The predetermined distance the ferrule protrudes through the aperture 42 and the accuracy to which the height of the detector 26 above the surface 25 of the base plate is known ensures that efficient butt coupling occurs between the fibre and detector. For example, a distance between the fibre and the detector of 50 um+/−10 um must be achieved. Thus the module can be aligned passively without requiring power of the active optical component, in this case the detector. This passive alignment method requires no additional coupling optics, such as lenses and mirrors and uses fewer steps during the assembly process and is thus less expensive than other known active coupling techniques.

The detector height can be controlled by using the flip chip mounting technique and by accurately knowing the thickness of the detector die.

The ferrules distance from the covering plate can be controlled during assembly by referring to marks located on the cover plate and/or by using accurate micro-positioning equipment.

Figure 8:
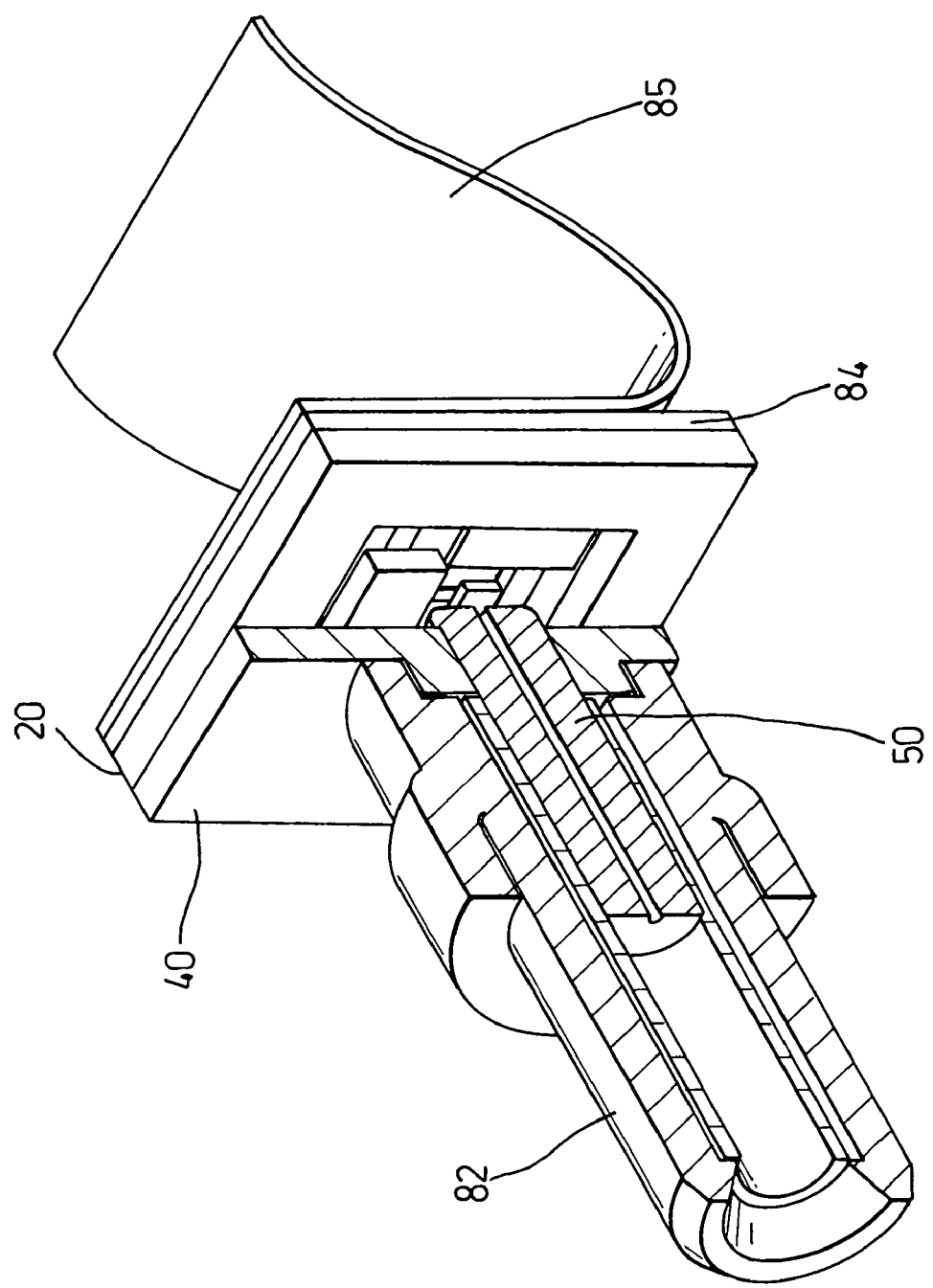
FIG. 8 shows the module package assembly with a front optical connector and a rear electrical connector.

As seen in FIG. 8, the sealed module package can now have further optical connectors 82 disposed over the ferrule to establish optical connection to the rest of the communication system. Furthermore, electrical connection can be achieved using an electrical connector 85 attached to the under surface 84 of the base plate 20. This electrical connector can be a flex connector.

Figure 9:
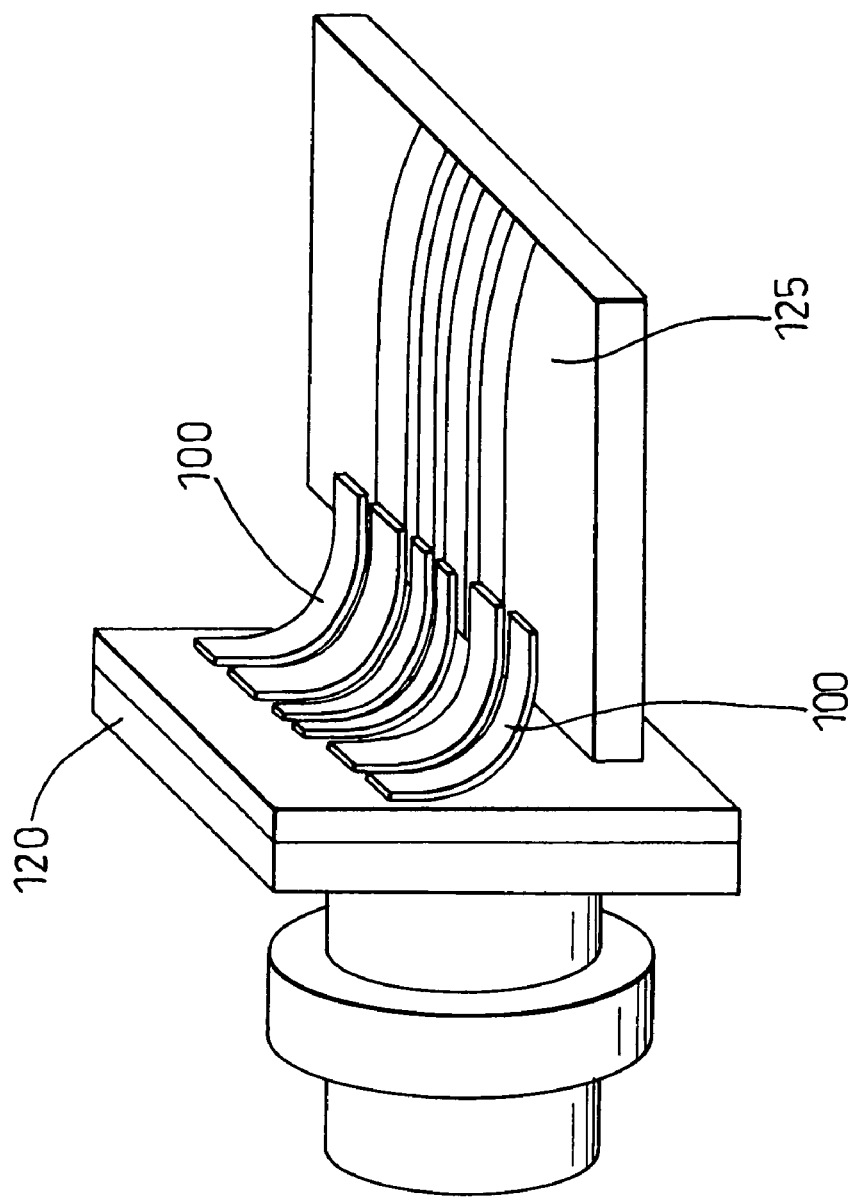
FIG. 9 shows an alternative electrical connection arrangement.

Alternatively, as seen in FIG. 9, electrical leads 100 can be used to establish electrical connection between the receiver package 120 and a print circuit board 125. The spacing and thickness of these leads can be chosen to reduce RF leakage from the receiver package and leave extra space for other electrical service connections. The use of leads instead of pins ensures furthermore a more flexible mechanical connection to the PCB.

As will be appreciated further embodiments of the above invention are envisioned and covered within the scope of the claims.

What is claimed is:

1. A method of passively aligning a high-speed optical module, said method comprising the steps of:
   disposing a ferrule within an aperture of an upper plate at a predetermined distance from said upper plate,
   disposing at least one active high speed optical component on a lower plate at a predetermined height above an upper surface of said lower plate, wherein said predetermined distance and said predetermined height are such that efficient optical coupling in the axial direction is achieved between a fibre disposed within said ferrule and said at least one active high speed optical component,
   visually aligning said upper plate with respect to said lower plate using overlapping images of the fibre and the at least one high speed optical component such that efficient optical coupling in the planar direction is achieved between said fibre disposed within said ferrule and said at least one active high speed optical component, and
   sealing said upper plate to said lower plate.

2. The method of claim 1, wherein said upper plate or said lower plate is ceramic.

3. The method of claim 1, wherein said at least one active optical component is flip chip mounted on said upper surface of said lower plate.

4. The method of claim 1, wherein said at least one active optical component is a detector.

5. The method of claim 4, wherein said detector is a PIN detector

6. The method of claim 4, wherein said detector is an avalanche detector.

7. The method of claim 1, wherein said module is an optical receiver.

8. The method of claim 1, wherein said at least one active optical component is a light source.

9. The method of claim 8, wherein said light source is a laser.

10. The method of claim 9, wherein said laser is a vertical cavity surface emitting laser.

11. The method of claim 1, wherein said module is an optical transmitter.

12. The method of claim 1, wherein said upper and lower plates are hermetically sealed.

13. The method of claim 1, wherein said module further comprises an electrical connector disposed on said lower plate.

14. The method of claim 13, wherein said electrical connector is a flex connector.

15. The method of claim 13, wherein said electrical connector is a series of electrical lead connectors.

* * * * *